United States Patent [19]

Reba

[11] 4,265,573

[45] May 5, 1981

[54] PARTICULATE MATTER DISPERSING AND TRANSPORTING SYSTEM

[75] Inventor: Imants Reba, Vancouver, Wash.

[73] Assignee: Crown Zellerbach Corporation, San Francisco, Calif.

[21] Appl. No.: 91,634

[22] Filed: Nov. 5, 1979

[51] Int. Cl.³ .................... B65G 53/14; B65G 53/42

[52] U.S. Cl. .................... 406/152; 406/153; 406/194; 406/195

[58] Field of Search .................... 406/82, 144, 152, 153, 406/157, 194, 195; 209/145; 239/419.3, 419.5, 427.5, DIG. 7, 421, 422

[56] References Cited

U.S. PATENT DOCUMENTS

| | | | |
|---|---|---|---|
| 1,391,744 | 9/1921 | Lower | 406/157 |
| 3,073,534 | 1/1963 | Hampshire | 239/422 |
| 3,859,205 | 1/1975 | Reba et al. | 209/145 X |
| 3,972,150 | 8/1976 | Hart | 239/422 X |
| 4,215,956 | 8/1980 | Reba | 406/152 |

*Primary Examiner*—James L. Rowland

*Attorney, Agent, or Firm*—Thomas R. Lampe

[57] ABSTRACT

A system for dispersing and transporting particulate matter including means defining a flow path for the particulate matter, a conduit defining an interior in fluid flow communication with the flow path and having an outlet, means for inducing a flow of the particulate matter from the flow path defining means through the conduit and out of the outlet, and fluid curtain generating means for directing converging multiple curtains of high velocity fluid against the particulate matter as it exits from the conduit outlet.

12 Claims, 2 Drawing Figures

PARTICULATE MATTER DISPERSING AND TRANSPORTING SYSTEM

BACKGROUND OF THE INVENTION

The present invention relates to a method and apparatus for dispersing and transporting particulate matter.

U.S. Pat. No. 3,859,205 issued to Reba et. al. describes a system utilizing the Coanda effect to separate or disperse particulate matter such as polyethylene fibers or the like and transport the dispersed fibers to a predetermined location. The system of U.S. Pat. No. 3,859,205 has been utilized in conjunction with a forming bell to lay down a layer of fibers that have been dispersed and transported on to a moving wire to form a non-woven web. While the system of U.S. Pat. No. 3,859,205 has been satisfactory in most respects some operational difficulties have arisen under certain conditions.

One such difficulty was the asymmetrical loading of the apparatus at the outset, resulting in nonuniformity of the web being formed by the system. In co-pending U.S. application Ser. No. 12,178, filed Feb. 14, 1979, applicant discloses a system he has developed that results in the more uniform dispersement of the particulate matter prior to its introduction into the Coanda nozzle of the system. This is accomplished by providing an arrangement for placing the particulate matter in a fluidized state prior to such introduction.

Another problem that has arisen in the use of the system of U.S. Pat. No. 3,859,205 has been a diminishing rate of performance under high load volume conditions. Specifically, the arrangement of U.S. Pat. No. 3,859,205 subjects fiber clumps to severe shredding or dispersing forces as they enter and pass through a high energy air curtain. This effect, however, diminishes as the loading rate of clumps increases. A clump travelling in the wake of the preceding one can catch up, creating either a larger clump with sufficient inertia to go through the curtain or it escapes through a "hole" in a curtain formed by the leading clump. In other words, at high fiber loading rates the material does not have sufficient time to efficiently absorb energy supplied by the curtain.

It is an object of the present invention to provide a solution to the aforesaid problem and provide an improved apparatus and method for dispersing and transporting particulate matter resulting in the more efficient dispersion of particulate matter such as synthetic fibers, wood fibers, etc.

SUMMARY OF THE INVENTION

The above and other objects have been attained by providing an apparatus for dispersing and transporting particulate matter comprising in combination means defining a flow path for the particulate matter, a conduit defining an interior in fluid flow communication with the flow path and having an outlet, means for inducing a flow of the particulate matter from the flow path defining means through the conduit and out of the outlet and fluid curtain generating means positioned adjacent the conduit for direction converging multiple curtains of high velocity fluid against the particulate matter as it exits from the conduit outlet. The conduit includes an outer conduit element and an inner conduit element, dividing the conduit interior into first and second passageways for the particulate matter leading from the flow path to the conduit outlet. The outer conduit element comprises fluid flow directing means spaced from the fluid curtain generating means. In particular, the outer conduit element has an outer generally smoothly curved flow-attachment surface to which the converging fluid curtains and particulate matter entrained thereby will become attached due the Coanda effect and flow therealong in a predetermined direction. In addition, the outer conduit element forms a Coanda nozzle comprising a generally smoothly curved flow-attachment surface formed by the inner wall of the outer conduit element leading from an annular slit formed in the inner wall through which a high pressure fluid passes. The Coanda nozzle causes gaseous flow within the conduit due to the Coanda effect and comprises the aforesaid means for inducing a flow of the particulate matter from the flow path defining means through the conduit and out of the outlet thereof.

GENERAL DESCRIPTION

Figure 1:
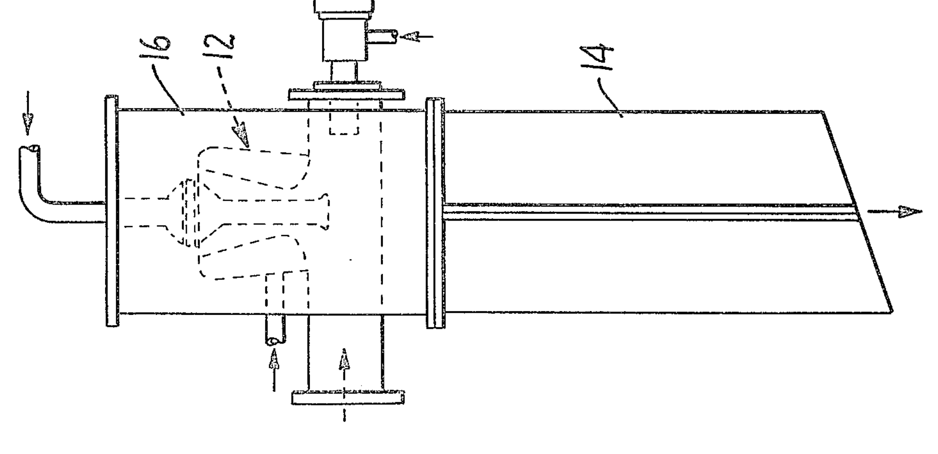
FIG. 1 is a side elevational view of the apparatus of this invention disposed in operative association with a forming bell.

FIG. 1 illustrates the apparatus of the present invention, designated generally by means by reference numeral 12, in operative association with a forming bell 14 of any suitable type. Since the forming bell per se does not comprise a portion of the present invention it will not be described in detail. Suffice it to say that the forming bell is of four-sided construction defining a circular inlet at the upper end thereof and a generally rectangular shaped outlet. It is to be understood the forming bell 14 performs the conventional functions of receiving particulate matter and spreading some laterally on a moving receiving surface such as foraminous screen (not shown) to form a non-woven web. Connected to the upper end of forming bell 14 by any suitable expedient is a shroud member 16 in the form of a conduit having a circular cross-section corresponding to the circular cross-section of the top of forming bell 14. Shroud member 16 may if desired be formed of a plurality of sections bolted or otherwise secured together.

Figure 2:
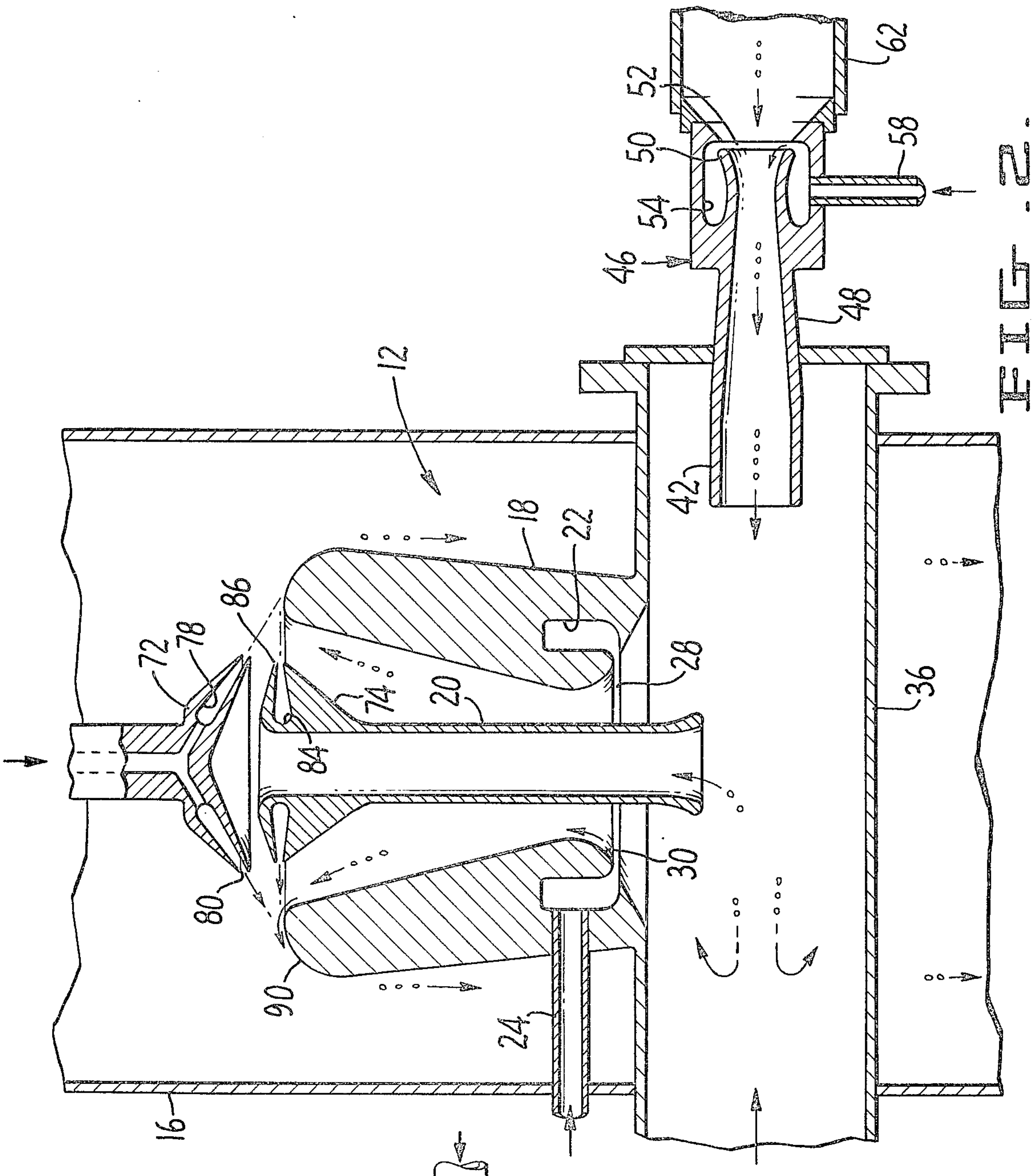
FIG. 2 is an enlarged side sectional view showing operational details of apparatus constructed in accordance with the teachings of the present invention.

Referring now to FIG. 2, apparatus 12 includes a conduit having an outer conduit element 18 and an inner conduit element 20 dividing the conduit interior into two separate passageways, an inner passageway having a circular cross-section defined by inner conduit element 20 and an outer passageway having an annular cross-section defined by the space between the inner and outer conduit elements. The outer conduit element 18 has an annular pressure chamber 22 formed therein. The pressure chamber is in communication with the interior of a pressurized fluid supply line 24 connected at the outer end thereof to any suitable source of pressurized fluid such as an air compressor (not shown). It will be appreciated that when communication is established between supply line 24 and a source of pressurized fluid said fluid will enter fluid pressure chamber 22 and exit from an annular slit 28 formed in the outer conduit element 18. Annular slit 28 is defined by a curved annular lip 30 forming a generally smoothly curved flow-attachment surface leading from the slit and diverging upwardly as shown. As pressurized gas exits from annular slit 28 the Coanda effect, described in detail in U.S. Pat. No. 3,859,205, will cause the fluid to attach itself to and follow the flow-attachment surface so that it flows upwardly into the passageway formed between the conduit elements. This rapidly moving air establishes a zone of reduced pressure on the opposite side of slit 28 from lip 30 so that the rapidly moving air entrains additional air and any particulate matter located in the zone of reduced pressure. Particles entrained by this fluid are thereby rapidly transported upwardly so that they exit from the outlet at the upper end of the conduit.

While the arrangement just described will cause transportation of particles within the inner passageway as well as the outer passageway, the entrainment of particles in the inner passageway defined by inner conduit element 20 will be caused primarily by the action of another component of the invention to be described below.

The outer conduit element 18 is attached at its lower end by any suitable expedient to a flow path for the particulate matter in the form of a conduit 36 which preferably functions as a fluidizing chamber in the manner taught in applicant's aforesaid U.S. patent application Ser. No. 12,178, filed Feb. 14, 1979. Conduit 36 is open to the atmosphere at the left end thereof as viewed in FIG. 2. The right hand of the conduit 36 is in operative association with means for introducing particulate matter into the fluidizing chamber. Specifically, a pipe 42 is positioned within the interior of conduit 36, said pipe having a substantially smaller diameter than the diameter of the conduit and disposed coaxially therein. Pipe 42 is connected to the outlet of an auxiliary Coanda nozzle 46. Coanda nozzle 46 includes an elongated member 48 defining a diverging inner flow path and an annular lip 50 defining an annular slit 52 leading from fluid pressure chamber 54. Fluid pressure chamber 54 is in turn in communication with the interior of a pressurized fluid supply line 58. It will be appreciated that auxiliary Coanda nozzle 46 operates in the same manner as previously described with respect to the Coanda nozzle defined by outer conduit element 18. That is, pressurization of fluid pressure chamber 54 will cause a rapid movement of air or other fluid through slit 52 whereupon the air will attach itself to the curved inner surface of annular lip 50 and proceed to the left as viewed in FIG. 2 through the flow path defined by elongated member 48 and pipe 42. Attached to the lip defining portion of the auxiliary Coanda nozzle 46 is a tubular element 62 which is attached at the other end thereof to a source (not shown) of particulate matter such as polyethylene fibers to be introduced into the system. Auxiliary Coanda nozzle 46 will entrain said fibers and propel them through the pipe 42 and into the interior of conduit 36.

At the time fibers are ejected from the end of pipe 42, annular pressure chamber 22 is also pressurized thus causing an upward flow of air in conduit elements 18 and 20. This creates a vacuum within the interior of conduit 36 and results in ambient air entering from the open left of the fluidizing chamber conduit in a direction diametrically opposed to the direction of movement of particulate matter exiting from pipe 42. This entrained air prevents fiber escape by reversing their direction of movement as shown by the arrows and also provides additional dilution. Thus, a virtually stationary cloud of fibrous material is disposed under both outer and inner conduit elements 18 and 20 before passing upwardly therethrough. Although the fluidizing arrangement of U.S. application Ser. No. 12,178, filed Feb. 14, 1979 is preferred for use in association with the present invention to fluidize particles in conduit 36, other suitable means may be employed to deliver particulate matter to the flow path communicating with the passageways defined by the conduit elements.

Fluid curtain generating means is provided for directing converging multiple curtains of high velocity fluid against the particulate matter as it exits from the conduit outlet. The fluid curtain generating means comprises two curtain nozzles 72 and 74 each of which has a peripheral cavity formed therein connected to suitable sources of pressurized air supply. Peripheral cavity 78 converges into an annular slit 80 which is so oriented as to direct the curtain of air in a downward direction. The peripheral cavity 84 of curtain nozzle 74 communicates with an annular slit 86 which directs a curtain of air in a direction intersecting the path of movement of the air curtain from nozzle 72, thus creating a highly turbulant air barrier intersecting the path of movement of fibers exiting from both passageways defined by conduit elements 18 and 20. A shearing action is thus created which will tend to break apart or deglomerate any clumps of particulate matter that may be present.

It should be noted that the fluid flow curtains intersect at a point quite close to the generally smoothly curved outer surface 90 of the outer conduit element 18. Due to its generally smoothly curved shape, surface 90 will function as a Coanda flow-attachment surface to which a substantial portion of the air curtains will attach themselves and be directed downwardly as shown by the arrows. This action will also cause entrainment of the particulate matter dispersed by the air curtain so that it is directed downwardly to the forming bell in a uniformly dispersed condition.

The fluid curtains perform yet another function. It will be appreciated that curtain flow will create a zone of reduced pressure in the vicinity of the outlet defined by inner conduit element 20. A flow of air and entrained particles upwardly through inner conduit element 20 will thus be promoted.

I claim:

1. Apparatus for dispensing and transporting particulate matter comprising, in combination:

means defining a flow path for said particulate matter;
a conduit defining an interior in fluid flow communication with said flow path and having an outlet;
means for inducing a flow of said particulate matter from said flow path defining means through said conduit and out of said outlet;
fluid curtain generating means positioned adjacent said conduit for directing converging multiple curtains of high velocity fluid against said particulate matter as it exits from said conduit outlet; and
fluid flow directing means spaced from said fluid curtain generating means, said fluid flow directing means having a generally smoothly curved flow-attachment surface to which said converting fluid curtains and particulate matter entrained thereby will become attached due to the Coanda effect and flow therealong in a predetermined direction.

2. The apparatus of claim 1 wherein said conduit includes an outer conduit element and an inner conduit element, said elements dividing said conduit interior into first and second passageways for said particulate matter leading from said flow path to said conduit outlet.

3. The apparatus of claim 2 wherein said fluid flow directing means comprises said outer conduit element.

4. The apparatus of claim 3 wherein said inner conduit element comprises a tubular member disposed concentrically within said fluid flow directing means.

5. The apparatus of claim 4 wherein said fluid curtain generating means comprises a nozzle means defining two annular fluid exit slits, and nozzle means being spaced from said tubular member and concentric therewith.

6. The apparatus of claim 2 wherein said flow inducing means includes a Coanda nozzle for entraining particulate matter in said flow path.

7. The apparatus of claim 6 wherein said Coanda nozzle comprises means defining an annular fluid exit slit formed in said outer conduit element and an annular generally smoothly curved fluid flow attachment surface leading from said slit toward said conduit outlet.

8. A method for dispensing and transporting particulate matter comprising the steps of:

conveying said particulate matter along a predetermined path of movement;

directing a first high velocity fluid curtain in a first direction intersecting said predetermined path of movement;

directing a second high velocity fluid curtain in a second direction intersecting both said predetermined path of movement and said first high velocity fluid curtain whereby said particulate matter is dispersed by the interaction of said high velocity fluid curtains; and directing the dispersed particles of said particulate matter to a predetermined location by utilizing the Coanda effect to attach at least a portion of said curtains and particles dispersed therein to a Coanda flow attachment surface.

9. The method of claim 8 wherein said step of conveying said particulate matter is carried out by entraining said particulate matter in a gaseous flow.

10. The method of claim 9 including the additional step of inducing said gaseous flow through utilization of the Coanda effect.

11. The method of claim 8 including the step of dividing the particulate matter into at least two separate portions prior to conveying thereof along said predetermined path of movement.

12. A method of dispersing and transporting particulate matter comprising the steps of:

conveying said particulate matter along a predetermined path of movement by entraining said particulate matter in a gaseous flow;

directing a first high velocity fluid curtain in a first direction intersecting said predetermined path of movement;

directing a second high velocity fluid curtain in a second direction intersecting both said predetermined path of movement and said first high velocity fluid curtain whereby said particulate matter is dispersed by the interaction of said high velocity fluid curtains;

utilizing said curtains to create a zone of reduced pressure to at least partially induce said gaseous flow; and directing the dispersed particles of said particulate matter to a predetermined location.

* * * * *